United States Patent [19]

Missig

[11] Patent Number: 5,122,011

[45] Date of Patent: Jun. 16, 1992

[54] ELASTOMERIC BUSHING ASSEMBLY FOR TORQUE ROD

[75] Inventor: Robert C. Missig, Berlin Heights, Ohio

[73] Assignee: Pullman Company, Livingston, N.J.

[21] Appl. No.: 616,354

[22] Filed: Nov. 21, 1990

[51] Int. Cl.⁵ .............................................. F16B 1/00
[52] U.S. Cl. ...................... 403/226; 403/227; 403/140
[58] Field of Search ............ 403/227, 226, 225, 130, 403/133, 224, 140

[56] References Cited

U.S. PATENT DOCUMENTS

| | | | |
|---|---|---|---|
| 1,983,796 | 12/1934 | Geyer | 403/226 |
| 2,814,538 | 11/1957 | Connolly | 403/140 X |
| 3,030,132 | 4/1962 | Compton | 403/226 X |
| 4,671,694 | 6/1987 | Brenner et al. | 403/227 X |
| 4,883,263 | 11/1989 | Buhl | 403/133 X |

Primary Examiner—Andrew V. Kundrat
Attorney, Agent, or Firm—John D. Kaufmann

[57] ABSTRACT

A bushing assembly for use with an associated torque rod comprises a bar pin, an elastomeric bushing, and an outer sleeve. The bar pin has a middle section which is generally rounded but which features a flat portion between 30% and 40% of the axial length of the middle section. The elastomeric bushing bonded to the bar pin is compressively received within the outer sleeve so that the total height is reduced by approximately 10%. The edges of the outer sleeve are curled inwardly toward a longitudinal axis of the assembly.

11 Claims, 3 Drawing Sheets

ELASTOMERIC BUSHING ASSEMBLY FOR TORQUE ROD

BACKGROUND OF THE INVENTION

1. Field of Invention

This invention pertains to the art of torque rods, such as are commonly used in the suspensions of motor vehicles, and more particularly to an elastomeric bushing assembly which functions as a maintenance-free ball joint.

2. Description of Related Art

Ball joints have been used in the suspensions of motor vehicles for many years. Some varieties require the use of lubricants to function properly. Others endeavor to provide good service without the need for lubricants and other maintenance. Some utilize elastomeric components to minimize metal to metal contact and provide maintenance-free service. For example, one such prior art ball joint is disclosed in International Polymer Science and Technology, 12, No. 5, 1985 reference MG 85/03/106; translation serial no. 9819.

Although ball joints currently in use have provided good service in some applications, in other applications they fail to meet the requirements of certain vehicles. Specifically, the loading associated with certain vehicles exceed the fatigue and strength properties of the ball joints. Ball joints are usually used where the joint must endure loading in radial, torsional, axial, and transverse tilting orientations. Further, because the ball joint is usually exposed to the elements, it is important that debris, such as gravel thrown up from the wheels of the motor vehicle, do not enter the assembly and damage it.

One disadvantage of the current prior art products are their inability to handle loading under certain conditions or load orientations.

A second disadvantage is their tendency to become damaged by road debris as was previously mentioned. A third disadvantage is the cost to manufacture and assemble the various components associated with the present designs.

The present invention contemplates a new and improved bushing assembly for use with a torque rod or ball joint which features fewer parts and, a lower cost of manufacture and assembly. Further, a unique feature contributes to discouraging debris from entering the ball joint and damaging the assembly. It overcomes the foregoing difficulties and others while providing better and more advantageous overall results.

SUMMARY OF THE INVENTION

In accordance with the present invention, a new and improved elastomeric bushing assembly is provided which is adapted to be used with an associated torque rod.

More particularly, in accordance with the invention, the bushing assembly includes a bar pin which has first and second ears and a middle section. The middle section is generally spherical in shape except for a flat portion. An elastomeric bushing is molded to the middle section of the bar pin. The bar pin and elastomeric bushing are received within a cylindrical outer sleeve.

In accordance with another aspect of the invention, the flat portion of the middle section of the elastomeric bushing is between 30% and 40% of the axial length of the middle section.

According to another aspect of the invention, the elastomeric bushing has an uncompressed height equal to the distance between the inner and outer surfaces of the elastomeric bushing, when measured perpendicularly to ar axis of the bushing. The elastomeric bushing is compressively received within the sleeve, so that the total bushing assembly's compressed height including bar pin is reduced by at least 10% due to its interference within the sleeve.

According to another aspect of the invention, the elastomeric bushing has a lateral surface which has a fold line extending generally concentrically about the axis.

According to another aspect of the invention, the lateral surface of the bushing has an uncompressed and a compressed orientation, and is a generally planar surface. In the uncompressed orientation, a line in the plane of the lateral surface intersects a vertical centerline of the bushing assembly at a point on the same side of a horizontal axial centerline of the assembly. In the compressed orientation, a line in the plane of the lateral surface of the elastomeric bushing intersects the vertical centerline at a point on the other side of the horizontal axial centerline.

In accordance with another aspect of the invention, the cylindrical outer sleeve has two edges which are curled inwardly toward the axis.

In accordance with another aspect of the invention, the curled edges of the sleeve create fold lines in the lateral sides of the bushing.

In accordance with another aspect of the invention, the curled edges of each comprise between 10% and 20% of the total axial length of the sleeve.

In accordance with another aspect of the invention, a method of assembling a bushing assembly for use with an associated torque rod comprises the steps of bonding the elastomeric bushing to the bar pin, lubricating the outer surface of the bushing, forcibly inserting the bushing into the sleeve so that the sleeve is compressed, and curling the edges of the sleeve inwardly toward an axis so as to create a fold line in the lateral sides of the bushing.

One advantage of the present invention is lower costs due to the elimination of several components used in current art devices.

Another advantage is the increased durability and load bearing capability due to the design of the middle section of the bar pin and the manner of assembling the components.

Another advantage is the improved life due to the inability of debris to enter the assembly and damage it.

Still other benefits and advantages of the invention will become apparent to those skilled in the art upon a reading and understanding of the detailed specification.

BRIEF DESCRIPTION OF THE DRAWINGS

The invention may take physical form in certain parts and arrangements of parts. A preferred embodiment of the invention will be described in detail in this specification and will be illustrated in the accompanying drawings which form a part hereof, and wherein.

DESCRIPTION OF THE PREFERRED EMBODIMENT

Figure 1A:
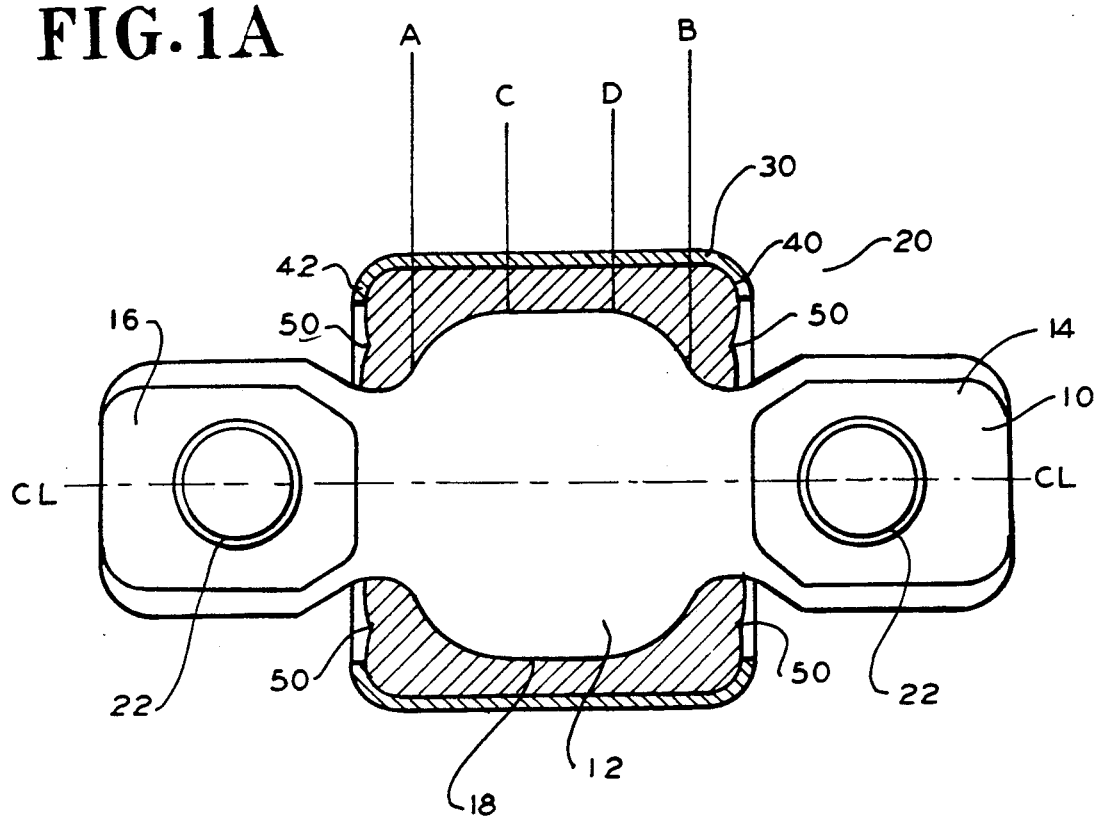
FIG. 1A is a cross-sectional view of an assembled bushing assembly according to the present invention.
Figure 1B:
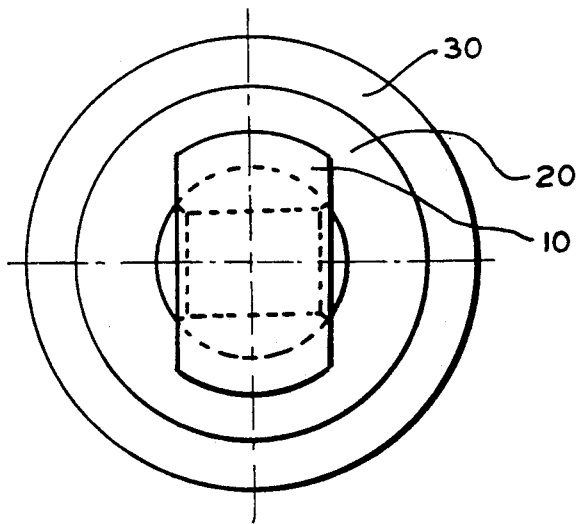
FIG. 1B is an end-view of the device shown in FIG. 1A.

Referring now to the drawings wherein the showings are for purposes of illustrating a preferred embodiment of the invention only, and should not be construed as limiting the same, FIG. 1A shows a cross-sectional view of the assembled bushing assembly according to the invention. The three primary components of the assembly are member, such as a pin or a bar pin 10, an elastomeric bushing 20 and a cylindrical outer sleeve 30.

Figure 2A:
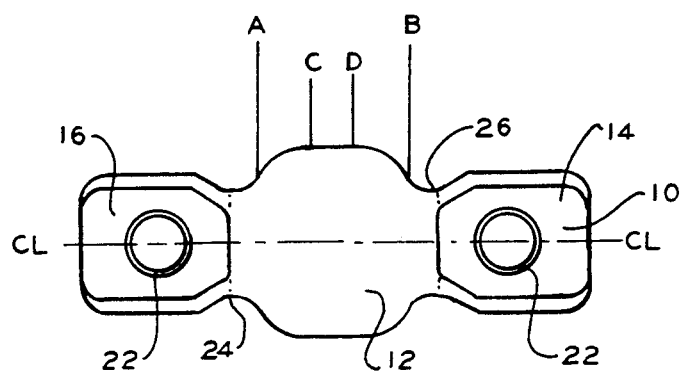
FIG. 2A is a front view of a bar pin according to the present invention.
Figure 2B:
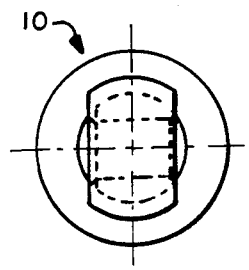
FIG. 2B is an end-view of the bar pin shown in FIG. 2A.

With reference to FIGS. 2A and 2B, the bar pin 10 has an enlarged middle section 12 lying between a pair of ears 14, 16. If, instead of the bar pin 10, the member is a tapered pin or similar member, one or both of the ears 14, 16 may be eliminated or modified, and the enlarged section 12 may be located at or near a terminus thereof, The middle section is considered to be the portion of the bar pin 10 between line A and line B. Line A and line B represent the point of inflection where the curvature of the middle section 12 of the bar pin 10 begins to change and the curvature begins to form one of the ears 14, 16. The middle section 12 of the bar pin 10 has a flat portion 18 which is located between line C and line D. Lines C and D are those points where the curved surface of the middle section flatten out and the radius of curvature becomes infinite. In the preferred embodiment, the flat portion 18 of the middle section 12 of the bar pin 10 is approximately 35% of the entire axial length of the middle section 12, when the axial length is considered to be the distance between line A and line B. The flat portion 18 of the middle section 12 has proven advantageous to withstand high loading in certain applications. Previous designs omitted the flat portion 18 featuring a middle section 12 which was entirely round and spherical. The flat portion 18 has proven significant in increasing the ability of the bushing assembly to withstand high radial loading. Additionally, the diameter of the middle section 12 was increased, creating a semi-spherical bulged shape. This increased diameter helps improve durability in transverse tilting applications. Grooves 24, 26 increase the bushing assembly's ability to bear conical loading.

Typically, the bar pin is made of steel and features a hole 22 in each ear 14, 16 to receive an associated bolt (not shown).

Figure 3A:
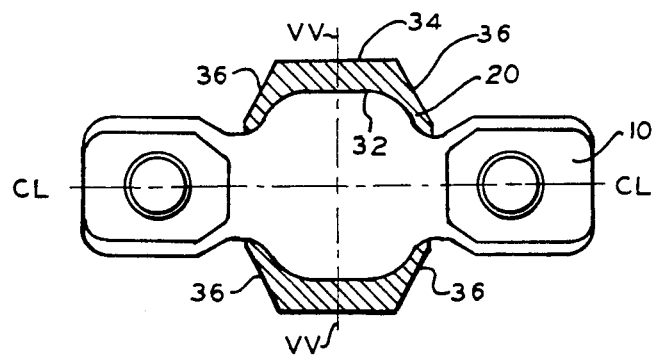
FIG. 3A is a cross-sectional view of a bar pin and elastomeric bushing according to the present invention.
Figure 3B:
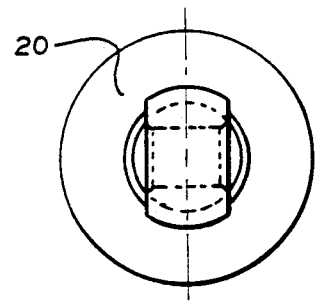
FIG. 3B is an end-view of the bar pin and elastomeric bushing shown in FIG. 3A.

With reference to FIGS. 3A and 3B, the elastomeric bushing 20 is bonded to the bar pin 10 through a chemical bond. Any adhesive which typically is utilized for bonding rubber to metal can be used, depending on the particular application. The elastomeric bushing 20 has an inner surface 32, lateral surfaces 36, and an outer surface 34. The inner surface 32 is bonded to the surface of the middle section 12 of the bar pin 10. In its uncompressed orientation, as shown in FIG. 3A, the lateral surfaces 36 are planar and have an orientation such that a line in the plane of the lateral surfaces 36 intersect a vertical centerline VV of the bushing assembly at a point on the same side of the longitudinal horizontal axis CL.

Figure 4A:
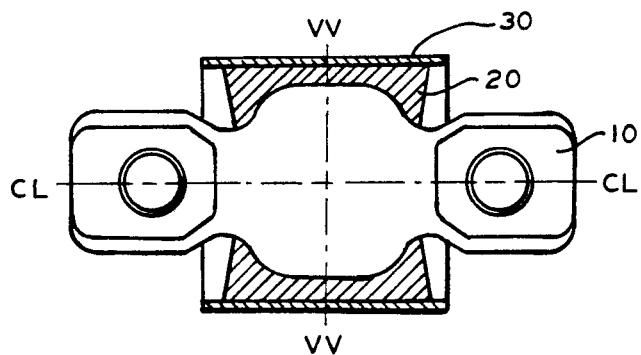
FIG. 4A is a cross-sectional view of a bar pin, elastomeric bushing, and a sleeve according to the present invention. The sleeve is shown in the uncurled position.
Figure 4B:
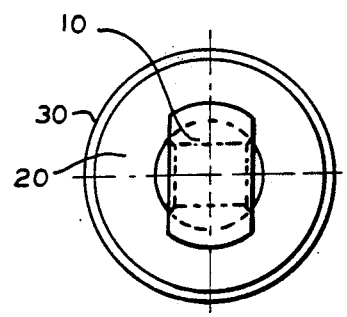
FIG. 4B is an end-view of the structure shown in FIG. 4A.

With reference to FIG. 4A and 4B, an outer sleeve 30 is shown. The outer sleeve is a cylinder whose inner diameter is less than the distance between outer surfaces 34 of the elastomeric bushing 20. In other words, when the elastomeric bushing 20 and bar pin 10 are fitted within the outer sleeve 30, the elastomeric bushing 20 must be compressed. One way of measuring this compression is the change in the height of the elastomeric bushing 20 from the uncompressed state to the compressed state. The height of the elastomeric bushing 20 is measured along line VV and is the distance between the inner surface 32 and the outer surface 34. In a preferred embodiment, the uncompressed height of the elastomeric bushing portion alone was 8.4 millimeters, while the compressed height was 4.89 millimeters, giving a 42% compression.

This compression causes the orientation of the lateral surfaces 36 of the elastomeric bushing 20 to distort. As shown in FIG. 4A they remain generally planar but have changes in their orientation so that a line within the plane of the lateral surfaces 36 in the compressed orientation will intersect line VV at a point on the other side of the horizontal axis line CL.

As can be seen from FIG. 4A, the axial length of the outer sleeve 30 extends beyond the axial length of the outer surface 34 of the elastomeric bushing. With reference to FIGS. 4A and 1A, a final step in the assembling process involves forming or curling the edges 40, 42 inwardly toward the horizontal axis line CL. In the preferred embodiment, each edge of 40, 42 is curled or otherwise formed toward the axis line CL to an extent that approximately of 15% of the original axial length of the outer sleeve 30 is formed into the curve. For example, in one curved embodiment, the original uncurled length of the outer cylinder, such as is shown in FIG. 4A, was 66 millimeters. After curling, the straight length between the two curled edge portions was 47 millimeters, meaning approximately 15% of the original axial length was curled at each edge.

This curling produces several advantages. The curled edges create thrust bearing areas which help confine the elastomer within the assembly. The edges also significantly increase the assembly's ability to carry radial and axial loads and its flex-life durability. The curled edges also eliminate the need for a snap ring and split ring which are commonly used in prior art designs. The curled edges 40, 42 provide a greater degree of compression which evidences itself in the formation of a fold line 50 in the lateral surfaces 36 of the elastomeric bushing 20. The curling, along with the associated bulging at the lateral surfaces of the elastomeric bushing 20 helps prevent road debris from entering the bushing assembly and degrading its integrity.

Figure 5A:
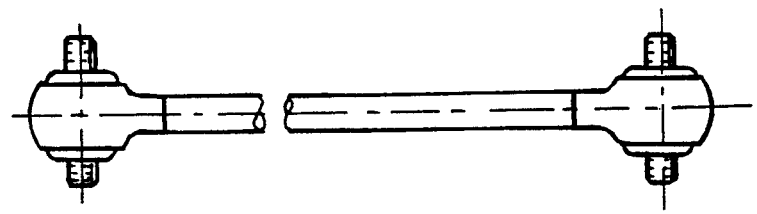
FIG. 5A is a top plan view of a torque rod such as is associated with the current invention.
Figure 5B:
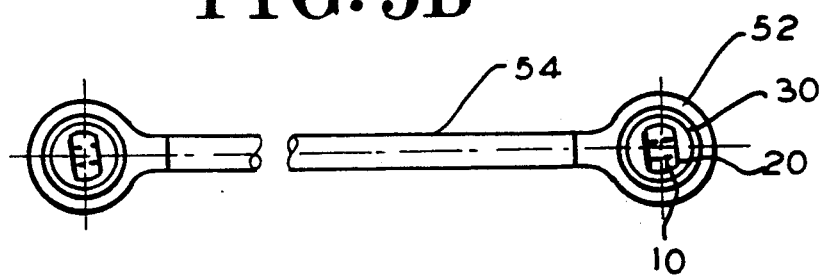
FIG. 5B is a front view of the torque rod shown in FIG. 5A.
Figure 6:
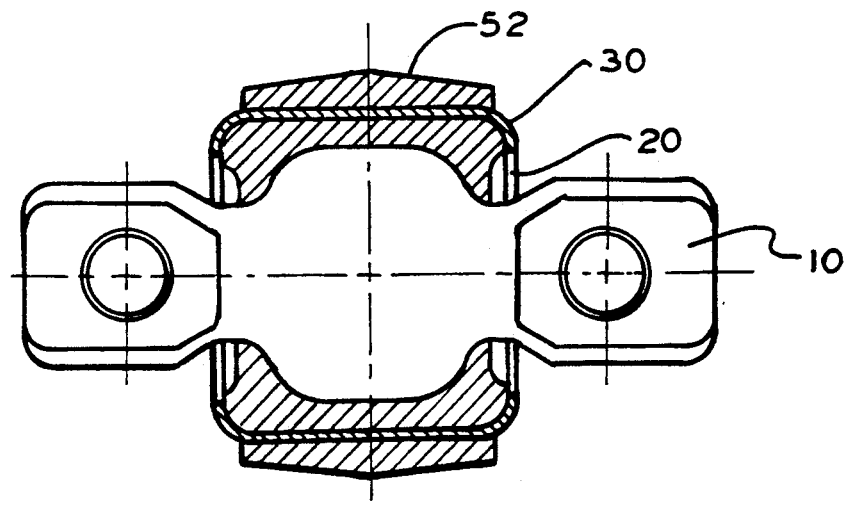
FIG. 6 is a cross-sectional view of the current invention when inserted within the torque rod as designed.

With reference to FIGS. 5A, 5B, and 6, when the edges 40, 42 have been curled, the bushing assembly is complete and is ready for insertion into the eye 52 of a torque rod 54. The eye 52 is commonly made of metal and the outer sleeve 30 fits within the eye as is common in the industry.

The advantages of the present invention are most easily understood in light of the prior art designs. The prior art designs did not feature curled edges on the outer sleeve, fold lines, and the simple three piece construction of applicant's invention. The method of assembling the prior art design bushing assemblies consisted of taking a cylindrical-like outer sleeve, inserting a bar pin into the cylinder to which had been bonded to an elastomeric bushing with formed washers bonded to each inner and outer end; placing a split ring washer on the second outer end of the elastomeric bushing, and then compressing the split ring washer against the lateral surface of the elastomeric bushing so that it compressed outwardly against the interior surface of the inner cylinder and inwardly toward the inner washer. When the compression was great enough to deflect the lateral surface of the elastomeric bushing sufficiently, a snap ring was then placed adjacent the split ring. The snap ring was sized to fit into a slot located in the inter surface of the outer sleeve.

This assembly provides some of the same features of applicant's invention, but with more parts and a more difficult assembly procedure. While the prior art designs also featured elastomeric bushings which were compressively located within a cylindrical outer sleeve, the compression took place once the elastomeric bushings were received within the sleeve and the compression was due to force applied along the longitudinal axis of the assembly. Two washers and a split ring and a snap ring were required to secure the assembly in place.

In contrast, the process for assembling applicant's invention begins with bonding the elastomeric bushing 20 to the bar pin 10. In the preferred embodiment, a lubricant is now applied to the outer surface 34 of the elastomeric bushing 20. preferably, the lubricant is chosen so that it will not react disadvantageously with the elastomer. The preferred lubricant is a naphthenic type assembly fluid. After the outer surface 34 has been lubricated, the elastomeric bushing 20 is forced into the outer sleeve with interference. This results in a reduction in the height of the elastomeric bushing. Typically, this reduction in heights of elastomer is on the order of 40% to 50%. This compression deforms the elastomer as discussed previously. Finally, the edges 40, 42 of the outer sleeve 30 are curled inwardly toward the longitudinal axis of the assembly. This curling has numerous advantages and creates a fold line 50 in the lateral surfaces 36 of the elastomeric bushing.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A bushing assembly for use with an associated torque rod, said assembly comprising:
   a member, said member having an enlarged section which is generally spherical in shape except for a significant flat portion;
   an elastomeric bushing, said bushing being bonded to said enlarged section of said member, said bushing having an inner surface adjacent said member, an outer surface and generally opposed lateral surfaces; and
   an outer sleeve, said outer sleeve being generally cylindrical and receiving axially therewithin said member and bushing, said outer surface of said bushing being adjacent an inner surface of said outer sleeve, the edges of said sleeve being formed toward the axis of the bushing assembly to engage and laterally compress said lateral surfaces of said bushing.

2. A bushing assembly as in claim 1 wherein said flat portion is an equatorial band extending about the enlarged section, a width of said flat portion being between 30% and 40% of the axial length of said enlarged section.

3. A bushing assembly for use with an associated torque rod, said assembly comprising:
   a member;
   an elastomeric bushing, said bushing having an inner surface fixedly bonded to said member, an outer surface, and two planar lateral surfaces, said bushing having an uncompressed height equal to the distance between said inner and outer surfaces measured perpendicularly to an axis of said bushing when said bushing is not being compressed and said lateral surfaces having an uncompressed and a compressed orientation; and,
   a cylindrical outer sleeve, said sleeve having an inner surface with an associated diameter, said bushing compressively received within said sleeve so that said bushing's uncompressed height is reduced by at least 10% due to interference with said sleeve and wherein said lateral surfaces orientation changes so that a line in the plane of said uncompressed orientation intersects a vertical centerline of said bushing assembly at a point on the same side of a horizontal axial centerline of said assembly whereas a line in said compressed orientation plane intersects said vertical centerline at a point on the other opposite side of said horizontal axial centerline.

4. A bushing assembly as in claim 3 wherein said bushing's uncompressed height is reduced by between 30% and 60% due to interference with said sleeve.

5. A bushing assembly as in claim 3 wherein said lateral surfaces have a fold line extending generally concentrically about said axis of the bushing assembly.

6. A bushing assembly for use with an associated torque rod, said assembly comprising:
   a pin having an enlarged section and an associated longitudinal axis, said enlarged section being generally rounded but having a flat area near an equator of said rounded enlarged section;
   an elastomeric bushing, said bushing having an inner surface, an outer surface, and two lateral surfaces, a distance measured perpendicularly to said axis from said inner surface to said outer surface being the uncompressed height of said bushing; and,
   a cylindrical outer sleeve having two edges, the pin and bushing received concentrically within said sleeve in a compressive manner such that the uncompressed height of said bushing is reduced by between 30% and 60% when received within said sleeve, the edges of said sleeve curled inwardly toward said axis, said curling effective to create a fold line in said lateral surfaces of said bushing.

7. A bushing assembly as in claim 6 wherein each of said curled edges comprises between 10% and 20% of the total length of said sleeve.

8. A bushing assembly as in claim 6 wherein said flat area is between 30% and 40% of the axial length of said middle section.

9. A method of assembling a bushing assembly for use with an associated torque rod, said bushing assembly comprising a pin, an elastomeric bushing having an outer diameter, inner diameter and lateral sides and a cylindrical outer sleeve having an inner diameter less than said bushing's outer diameter, said method comprising the steps of:

bonding the elastomeric bushing to the pin;

forcibly inserting said pin and bushing into said sleeve so that said bushing is compressed; and, curling edges of said sleeve inwardly toward an axis of the sleeve so as to create a fold line in the lateral sides of said bushing.

10. A method of assembling a bushing assembly as in claim 9 further comprising the step of, before forcibly inserting said pin and bushing into said sleeve;

lubricating an outer surface of said bushing.

11. A bushing assembly as in claim 1, wherein:

other than the formed edges of the sleeve, there are no elements, which act against the lateral surfaces of said bushing.

* * * * *